United States Patent [19]

Sato et al.

[11] Patent Number: 4,955,306
[45] Date of Patent: Sep. 11, 1990

[54] SEWING MACHINE

[75] Inventors: Tadashi Sato, Hirakata; Shigeo Neki, Osaka, both of Japan

[73] Assignee: Matsushita Electric Industrial Co., Ltd., Kadoma, Japan

[21] Appl. No.: 218,008

[22] Filed: Jul. 12, 1988

[30] Foreign Application Priority Data

Jul. 14, 1987 [JP] Japan .................. 62-175179

[51] Int. Cl.⁵ ............... D05B 69/18; D05B 69/22
[52] U.S. Cl. .................... 112/275; 112/300
[58] Field of Search ............. 112/275, 277, 300, 67, 112/87

[56] References Cited

U.S. PATENT DOCUMENTS

| 4,080,914 | 3/1978 | Ishida et al. ............ 112/300 X |
| 4,173,193 | 11/1979 | Morinaga et al. .......... 112/275 |
| 4,515,098 | 5/1985 | Walther ................. 112/274 |
| 4,627,370 | 12/1986 | Nakamura ............... 112/275 |
| 4,691,653 | 9/1987 | Neki et al. ............. 112/275 |

FOREIGN PATENT DOCUMENTS 0045952 2/1982 European Pat. Off. .
2184568 6/1987 United Kingdom .

Primary Examiner—Peter Nerbun
Attorney, Agent, or Firm—Cushman, Darby & Cushman

[57] ABSTRACT

In a sewing machine, immediately after every thread trimming, the electric motor is reversely rotated for a predetermined angle, hence reversely rotating the sewing mechanism, so that the needle bar is brought up to its upper dead point when the electric motor is stopped after the thread trimming, and, thereby, there is no fear of spoiling the object cloth by the needle tip. The predetermined angle is controlled by processing an output signal of a speed detector.

4 Claims, 13 Drawing Sheets

SEWING MACHINE

FIELD OF THE INVENTION AND RELATED ART STATEMENT

1. Field of the Invention

The present invention relates to a sewing machine, particularly to a sewing machine provided with an automatic thread trimmer.

2. Description of the Related Art

Recently as a sewing machine for industrial use, many of these sewing machines have an automatic thread trimmer, which enables for efficient working and a high quality produce even with an unskilled worker. Also, a constant position stopping is familiar.

The general configuration of a sewing machine is illustrated with reference to FIG. 11 and FIG. 12.

In FIG. 11, a sewing machine 1 is driven by an electric motor 3 through a belt 2. When a control pedal 4 is pressed down forward, a pedal sensor 5 detects motion of the pedal 4. The pedal sensor 5 gives a signal to a speed setting circuit and a drive instruction circuit. The electric motor 3 is driven at a revolution speed corresponding to press-down degree of the pedal 4. Minimum revolution speed is retained by a retention circuit so that even after releasing the pedal from pressing-down, a slow revolution speed of the motor is retained. The electric motor is stopped when receiving a position signal issued from the position detector, and at the timing when a needle stop position is detected by a needle position detector so that the motor is stopped at a desired position (up position) of the needle.

In the above-mentioned general industrial-use sewing machine, when the pedal 4 is restored to the neutral position to release the retention of the revolutional speed, the motor 3 is instantly decelerated. And when the needle comes to an up position the motor 3 is stopped. In the general configuration, when the pedal 4 is pushed again, the pedal sensor 5 again gives a driving signal thereby to set a driving speed to the motor 3. Though the conventional sewing machine has a known sequence control circuit for controlling necessary operations of the sewing machine, detailed description thereof is omitted for simplicity of elucidation here.

The conventional general sewing machine is provided with a thread trimmer which is configured, for example, as follows with reference to FIG. 12:

When the pedal is turned from a previous pressed-down position to a neutral position, the needle stops at its lowest position since a needle-down signal has been given from the position detector. When the pedal 4 is pressed reversely from the neutral position, a mechanical system (not shown) drives the needle to its needle-up position, energizing a thread trimming solenoid (not shown) during the upward motion of the needle as shown in FIG. 13. The needle-up position is defined as the position when the thread take-up lever 28 is at its upper dead point. The needle take-up lever 28 must be at its upper dead position, since for thread trimming the thread 29 must be tight as shown in FIG. 12.

In the above-mentioned general configuration, the object cloth is liable to be damaged by the needle tip, since the needle tip is liable to stop after over-running its upper dead point, such over-run corresponding to the upper dead point of the thread take-up lever 28 as shown in FIG. 13. This phenomenon is, in many cases a problem for thick thread sewing, where the mechanism has great inertia, the mechanism cannot be stopped immediately after trimming of the thread, and the needle tip is liable to stop at a relatively low position as a result of over-running the upper dead point of the thread take-up lever 28.

OBJECT AND SUMMARY OF THE INVENTION

A primary object of the present invention is to provide a sewing machine that prevents damaging the object cloth by the needle tip at insertion in the sewing by providing a reverse rotation of the electric motor by a predetermined angle immediately after thread trimming action, thereby enabling the needle to stop at the upper dead point thereof.

The present invention can be applied to various kinds of sewing machines.

The sewing machine in accordance with the present invention can stop the needle substantially at its upper dead point even when thread used in the sewing machine varies, by varying the needle position after the thread trimming is performed.

The sewing machine in accordance with the present invention further enables stopping of the needle at its upper dead position even when the gear reduction ratio between the electric motor and the sewing machine changes.

The above-mentioned purpose and technical advantages are effected by providing a sequence control part for instructing rotation direction. This enables the electric motor to rotate a desired predetermined angle in relation to the thread trimming.

The sewing machine in accordance with the present invention comprises.

a sewing mechanism including a thread trimmer, an electric motor for driving the sewing mechanism, a speed detector for detecting rotation speed of the sewing mechanism by issuing a predetermined number of speed signal pulses during the while the sewing mechanism makes one period motion thereof, a needle position detector for detecting position of needle, a speed controller circuit for controlling rotation speed and stopping position of the sewing mechanism, a sequence control part for controlling seqential operation of the sewing machine, including a sequence controller for controlling at least the thread trimmer, an angle counter for counting angle of rotation of the sewing machine by counting the speed signal pulses and reverse rotation means for making reverse rotation of the motor for a predetermined angle after stopping of the sewing mechanism.

With the above-mentioned configuration, the sewing machine in accordance with the present invention can trim the thread when the thread take-up lever is at its upper dead point, and, thereafter, the needle bar can be stopped at its upper dead point after the necessary reverse rotation. Therefore, thread trimming is stably made, and the gap between the needle tip and the needle plate can be at its maximum when the needle bar stopped.

DESCRIPTION OF THE PREFERRED EMBODIMENT

Preferred embodiments of the present invention are described with reference to the drawings of FIG. 1 through FIG. 10.

Figure 1:
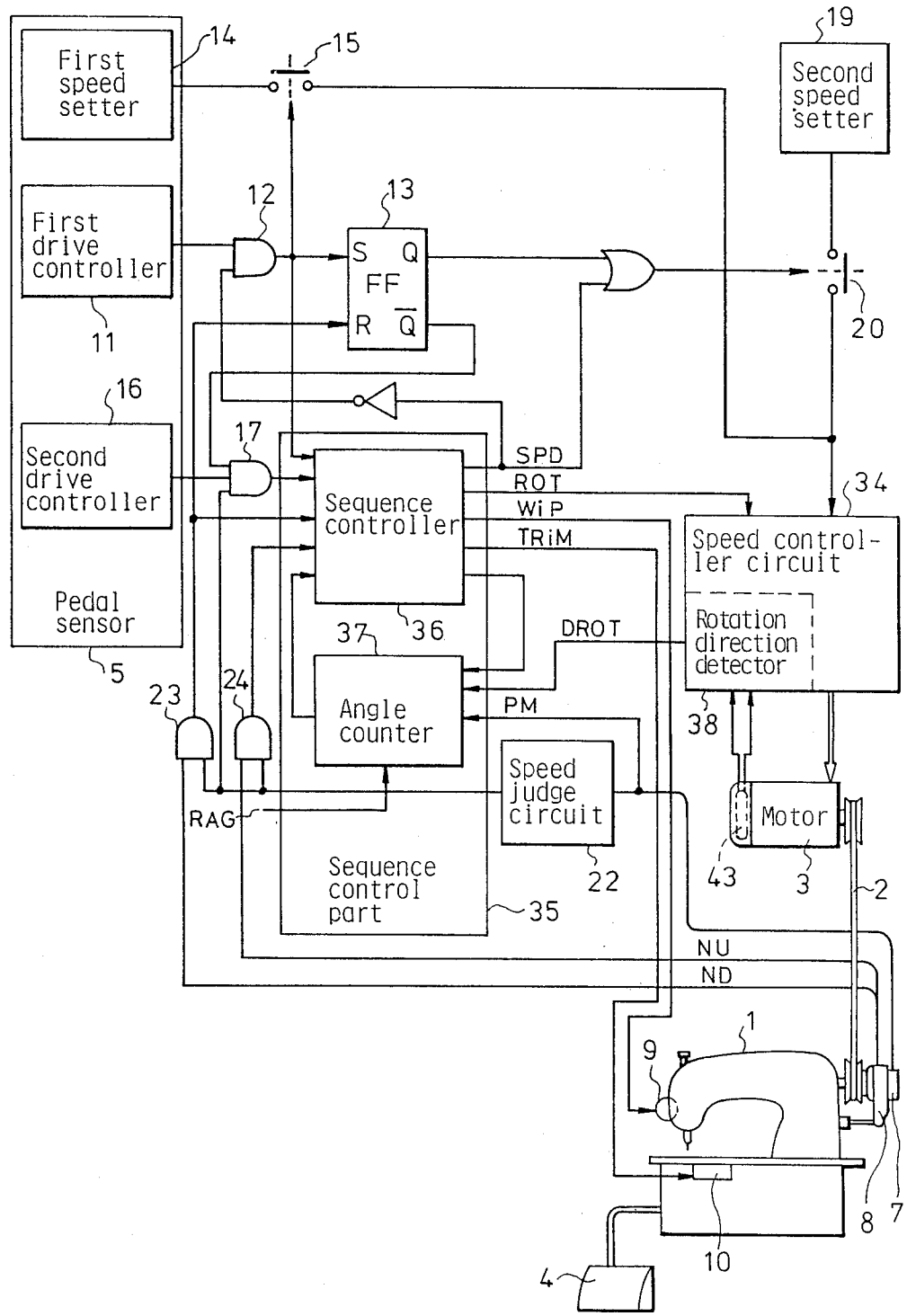
FIG. 1, FIG. 4, FIG. 6 and FIG. 8 are block diagrams of preferred embodiments of a first, a second, a third and a fourth preferred embodiments of the present invention.
Figure 2:
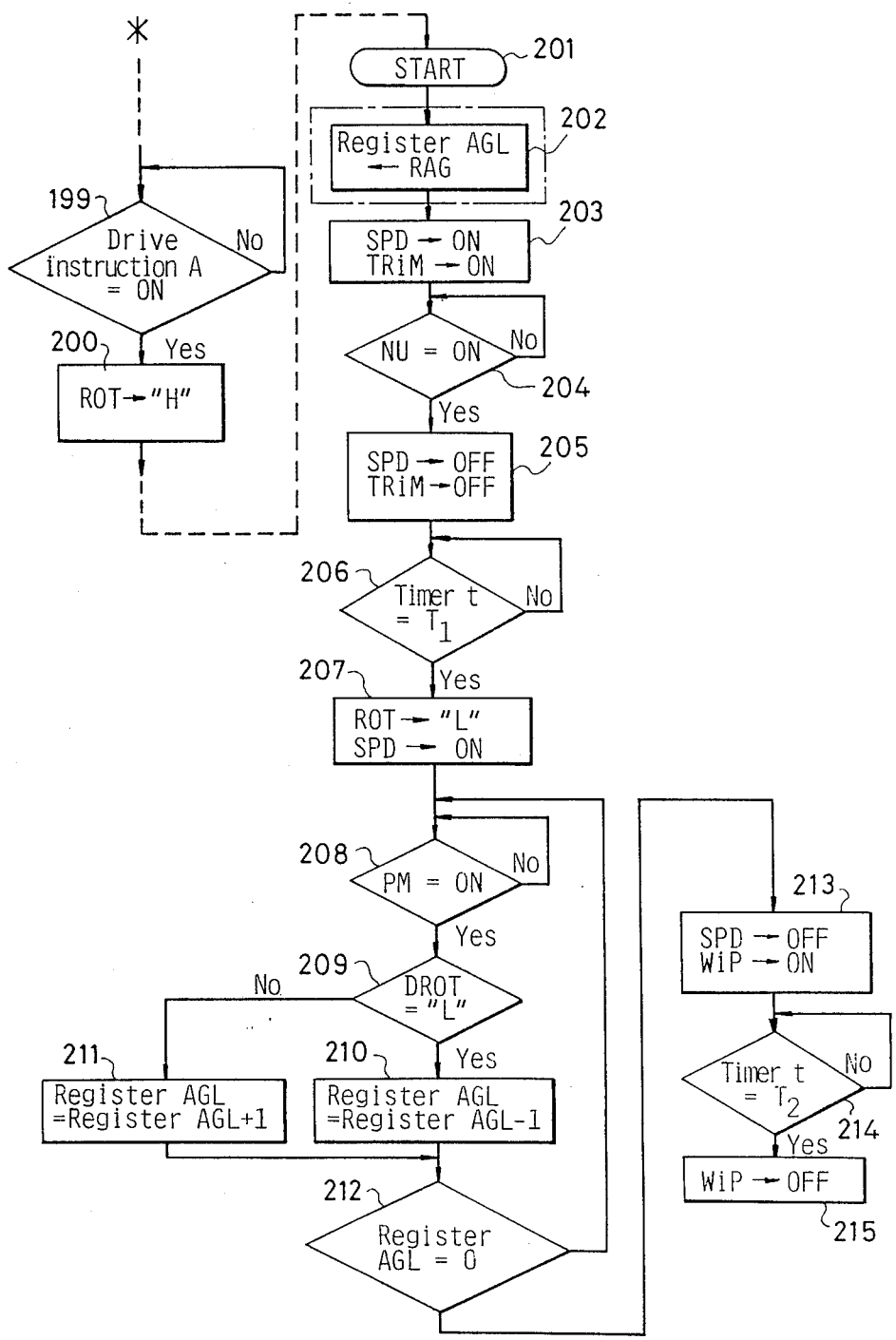
FIG. 2, FIG. 5, FIG. 7, FIG. 9 and FIG. 10 are flow charts of a sequence control part of respective embodiments.
Figure 3:
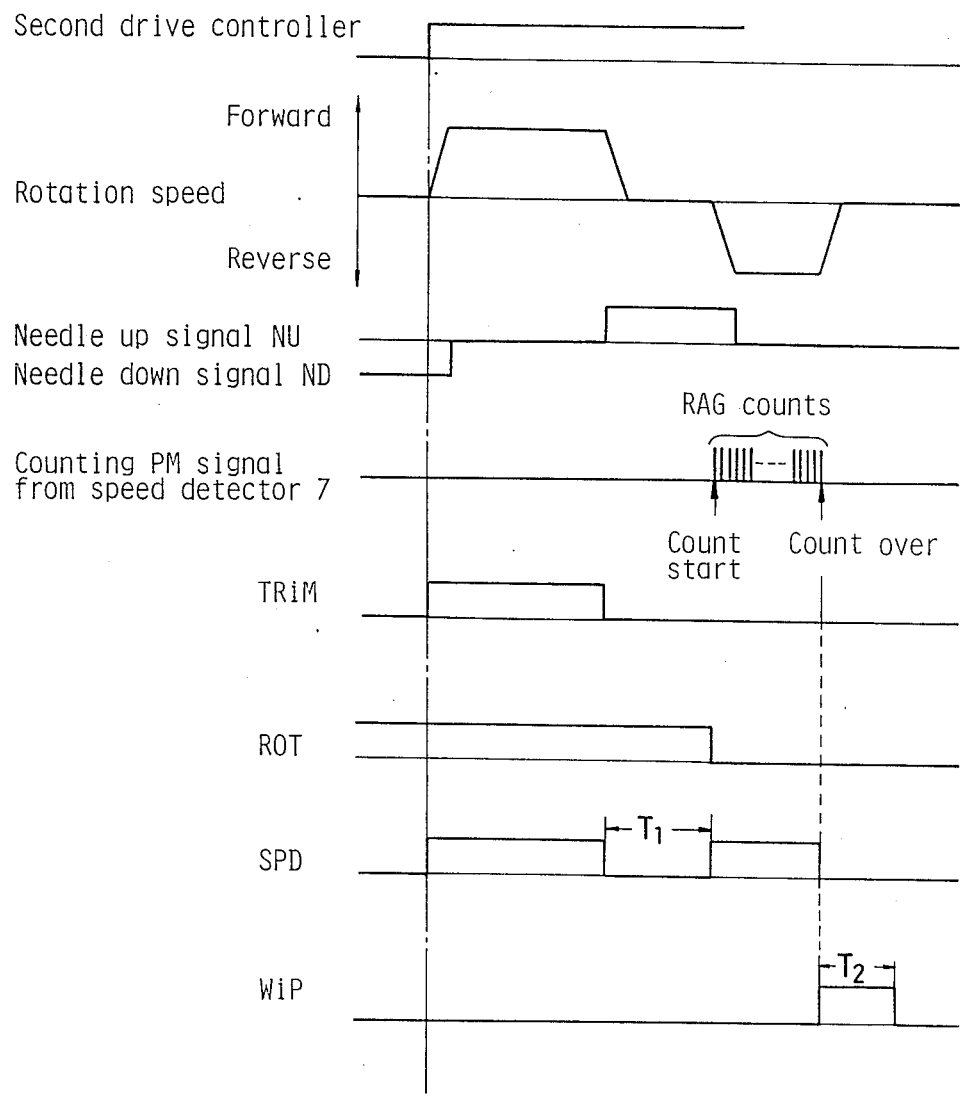
FIG. 3 is a time chart of a first embodiment.

FIG. 1 through FIG. 3 show a first preferred embodiment. In the circuit block diagram of FIG. 1, a pedal sensor 5, which is a sensing part for producing electric signals responding to motion and stop of a pedal 4, is operated by foot. The pedal sensor 5 has a first speed setter 14, a first drive controller 11 and a second drive controller 16. Output of the first drive controller 11 is given through an AND circuit 12 to a set terminal S of a flipflop 13 and also to a first switch 15. Output of the first speed setter 14 is given through the switch 15 to a speed controller circuit 34. In this embodiment, the speed setter 14 is designed output a signal corresponding to the amount pedal 4 is pressed down. A second speed setter 19 is connected to give its output through a second switch 20 to the speed controller circuit 34. The speed controller circuit 34 outputs current to the motor 3 that corresponds to the speed instructed by the input signals when the rotation speed is so low to enable immediate stop of the motor, a speed judge circuit 22 passes output from a speed detector 7, which produces an output signal corresponding to rotation speed of the sewing machine, and gives the speed detection signal to AND circuits 17, 23 and 24. The AND circuit 17 controls passing of the output signal of the second drive controller 16 to a sequence controller 36 in a sequence control part 35. The AND circuit 23 and the AND circuit 24 control passing of output signals from the needle position detector 8 to the sequence controller 36. Output of the speed detector 7 is given to the sequence controller 36, through an angle counter 37, in the sequence control part 35. The second drive controller 16 issues a signal which is similar to that from the first drive controller 11 but is issued when the pedal 4 is pushed in reverse direction.

The motor 3 in this embodiment is a DC brushless motor. Accordingly, a speed detector 43, which is built in the motor 3, issues two output signals having a given phase differences therebetween. By receiving one of the two output signals from the speed detector 43, a revolution direction detector 38 in the speed controller circuit 34 issues a rotation detection signal to the angle counter 37. The motor 3 drives the sewing machine through a belt conveyer 2. A thread trimming solenoid 10 and a thread wipe out solenoid 9 are driven by outputs from the sequence controller 36.

Operation of the above-mentioned sewing machine circuit will now be described: When the pedal 4 is pressed down forward, the first drive controller 11 of the pedal sensor 5 issues a drive signal and the first switch 15 is closed. Accordingly, output from the speed setter 14, corresponding to the extent pedal 4 is pressed down, is given through the first switch to the speed controller circuit 34. Therefore, the speed controller circuit 34 produces a driving current in response to the signal of the speed setter 14, and, by receiving two signals from the speed detector 43, the rotation direction is detected. By receiving a forward rotation signal of ROT issued from the sequence controller 36, which originates from a signal from the first drive controller 11, the motor 3 rotates in forward direction. At the same time, the flipflop 13 is set by the signal from the first drive controller 11 and hence the second switch 20 is closed, thereby keeping the motor 3 to rotate at a predetermined rotation speed set by the second speed setter 19. Ordinarily, the rotation speed set by the second speed setter 19 is selected to be such a low speed that the needle bar 27 can immediately stop at a predetermined position when the position is detected. Therefore, when the first drive controller 11 ceases to issue its output, the motor speed is immediately decelerated, and when the speed judge circuit 22 judges that the speed is decelerated to a value to be able to immediately stop, the flipflop 13 is reset from the output of the needle position detector 8. Therefore the second switch 20 is opened to stop the motor 3.

Next, by a reverse press-down of the pedal 4, the needle is brought up by short reverse rotation of the motor after thread trimming operation, and the second drive controller 16 issues output to the sequence controller 36. This output passes through the AND circuit 17 when the condition is fulfilled such that "step of given-position-stopping is completed" and "the rotation of the motor becomes sufficiently low", the sequence controller 36 starts operation. The sequence controller 36 is for issuing various signals such as stopping of the motor 3, energizing the thread trimming solenoid 10, the thread wipe out solenoid 9, the thread release solenoid (not shown) and the cloth-press-bar release solenoid in sequential operations responding to the needle position signal and the predetermined time sequence. In this embodiment, besides the above-mentioned sequential operations, the rotation signal ROT to instruct the forward rotation or reverse rotation of the motor 3 is issued from the sequential controller 36.

Next, operations by sequential control part 35 after the reverse pressing of the pedal 4 are described with reference to the flow charts of FIG. 2 and time chart of FIG. 3 besides the block diagram of FIG. 1.

First, when the pedal 4 is reversely pressed down, the first drive controller 11 becomes ON, and then an initial setting which includes ROT signal for instructing the rotation direction of the motor 3 is made (steps 199–200).

When the sequence control part 35 starts its operation, start step 201 and the following steps are executed. That is, initial settings are made to set a given number "RAG", determined corresponding to construction of the sewing machine in a register "AGL" included in the angle counter 37 for counting number of pulse from the speed detector 7, which gives angle of reverse rotation, and so on (step 202). Thereafter, output "SPD" issued from the sequence controller 36 is initialized to ON thereby to rotate the motor 3, and at the same time an output TRiM from the sequence controller 36 is made ON to actuate the thread trimming solenoid 10 (step 203). When the needle position detector 8 detects the needle up position and issues a needle-up signal "NU"

(step 204), the speed control signal "SPD" is made OFF (step 205) to stop the motor 3. Then the signal "TRiM" is made OFF (step 205) to turn the thread trimming solenoid 9 OFF. Subsequently, after lapse of time "$T_1$", the signal "SPD" is made ON (step 206). In this time, the signal "ROT" becomes "L", which initiates reverse rotation (step 207). Resultantly, the motor 3 drives the sewing machine in the reverse direction for a short time. When the motor 3 rotates in reverse direction, a signal "PM" from the speed detector 7 is input to the angle counter 37 (step 208). At every input of the "PM" signal, the angle counter 37 decreases the count "1" from the initial value "RAG". When the count in the angle counter 37 becomes "0" (step 212), the output of the angle counter 37 is given to the sequence controller 36, thereby turning OFF output "SPD" of the sequence controller 36 (step 213) and the motor 3 is stopped. If the motor 3 does not stop within the predetermined time $T_1$ (step 214) and continues to turn in forward direction, the rotation direction detector 38 of the speed controller circuit 34 issues a signal "DROT" of "H" level to the angle counter 37, which thereafter adds each count "1" to the content value "RAG" therein at every inputtings of the signal "PM" (step 209–211).

As has been described, according to the above-mentioned first embodiment, instructing the rotation direction by the sequence controller 36 and having the angle counter 37 for counting the speed detection signal, the sewing machine can be rotated for a desired angle in reverse direction at the thread trimming operation, followed by restoring the needle bar to the upper dead point after completion of the thread trimming operation. The desired angle can be determined with a high angular resolution, as determined by each pulse of the output signal issued. The number of pulses could be, for example, 360 for every-one rotation of the speed detector 7.

Figure 4:
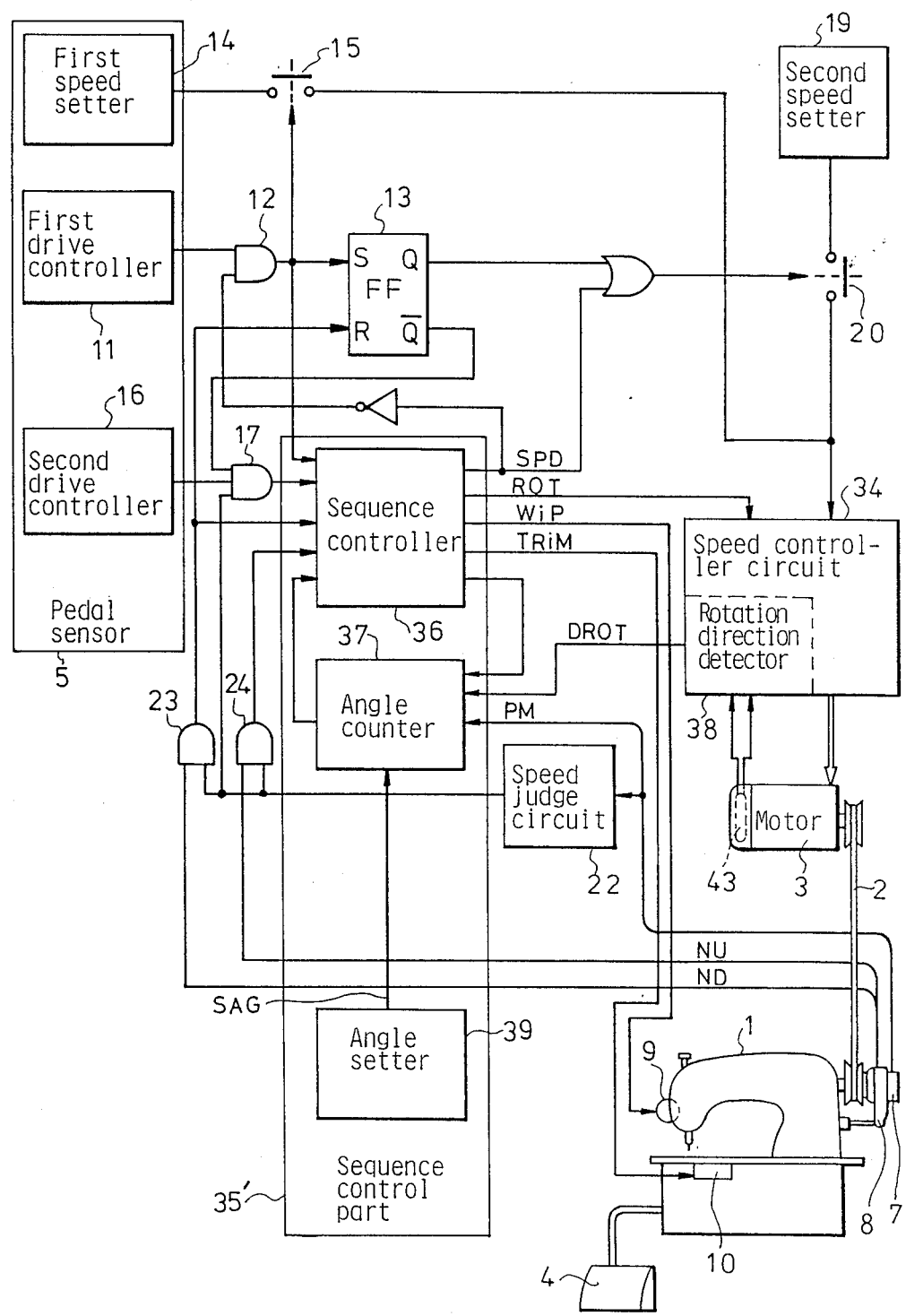
Figure 5:
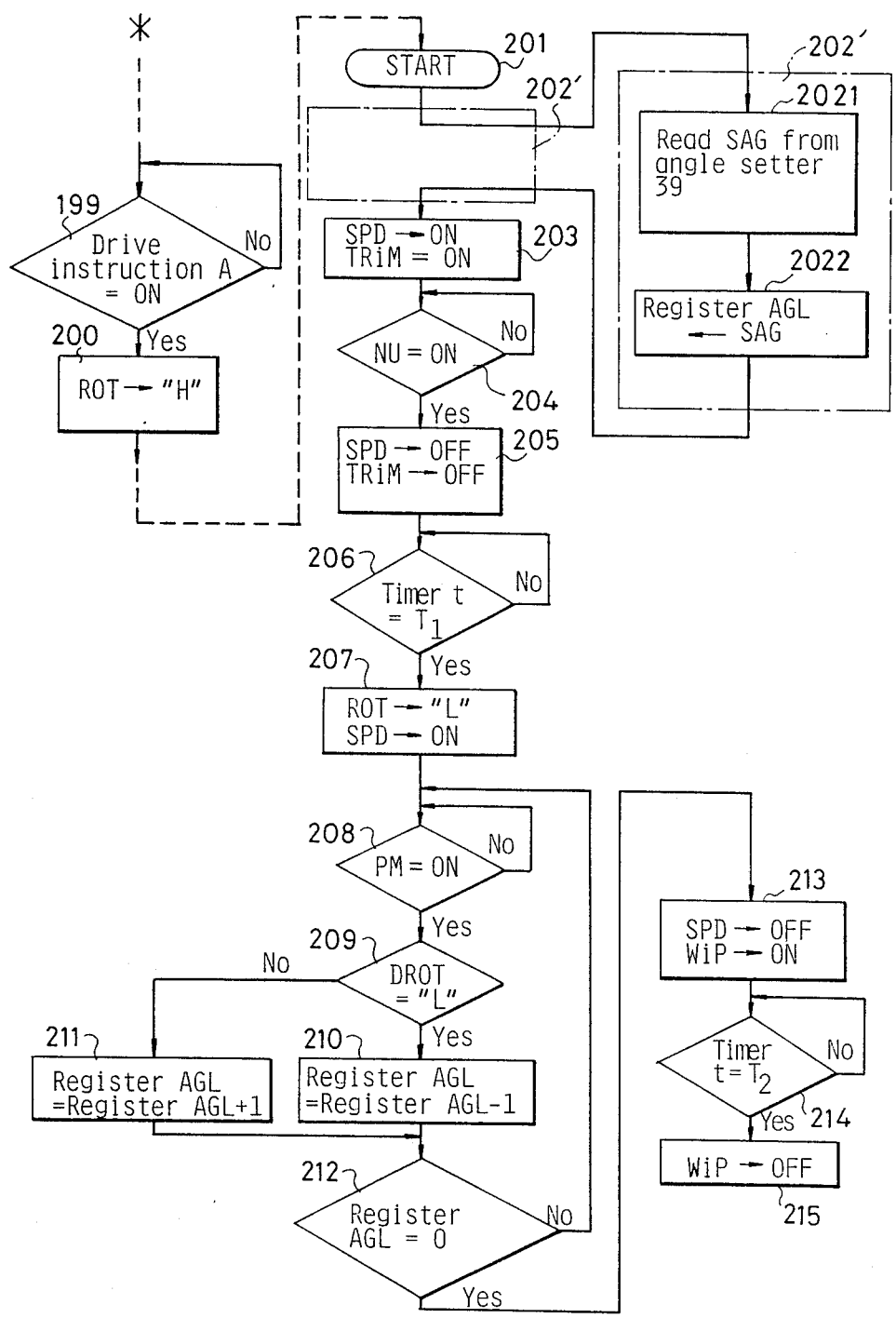

A second preferred embodiment of the present invention is now described with reference to FIG. 4 and FIG. 5, wherein FIG. 4 is a circuit block diagram and FIG. 5 is a sequence flow chart for realizing the operation of the sequence control part 35' of the circuit.

In this second embodiment, the similar or the same parts and components are designated by the corresponding numerals and marks, and redundant descriptions are omitted for simplicity. The difference from the first embodiment of FIG. 1 is that an angle setter 39 is provided in the sequence control part 35'.

The extent of reverse direction rotation of the sewing machine after thread trimming to lift up a needle varies depending of mechanical configuration of respective sewing machines. In order to carry out optimum control, the reverse direction rotation of the sewing machine, after thread trimming, should be adjusted to suit various kinds of sewing machines. Therefore, the angle setter 39 is provided in the sequence control part 35'. The operation of the angle setter 39 is as follows. When the sequence control part 35' starts its operation in a manner as is described with the first embodiment, apart from the step 202 of the flow chart of FIG. 2, the flow chart of FIG. 5 has, in the step 202', two steps, namely 2021 of reading angle signal SAG from the angle setter 37 and the following step 2022 of initializing the register "AGL" by the number "SAG". The other parts of the flow chart are identical to corresponding parts of the flow chart of FIG. 2.

As has been described, according to the second embodiment, the reverse rotation angle after the thread trimming can be arbitrarily set by the angle setter 39. Therefore, even when the configuration of the sewing machine is changed or the manner of adjustment of the thread trimming mechanism changes, the most appropriate thread trimming action, followed by lifting up the needle at the highest position, is satisfactorily realized.

Figure 6:
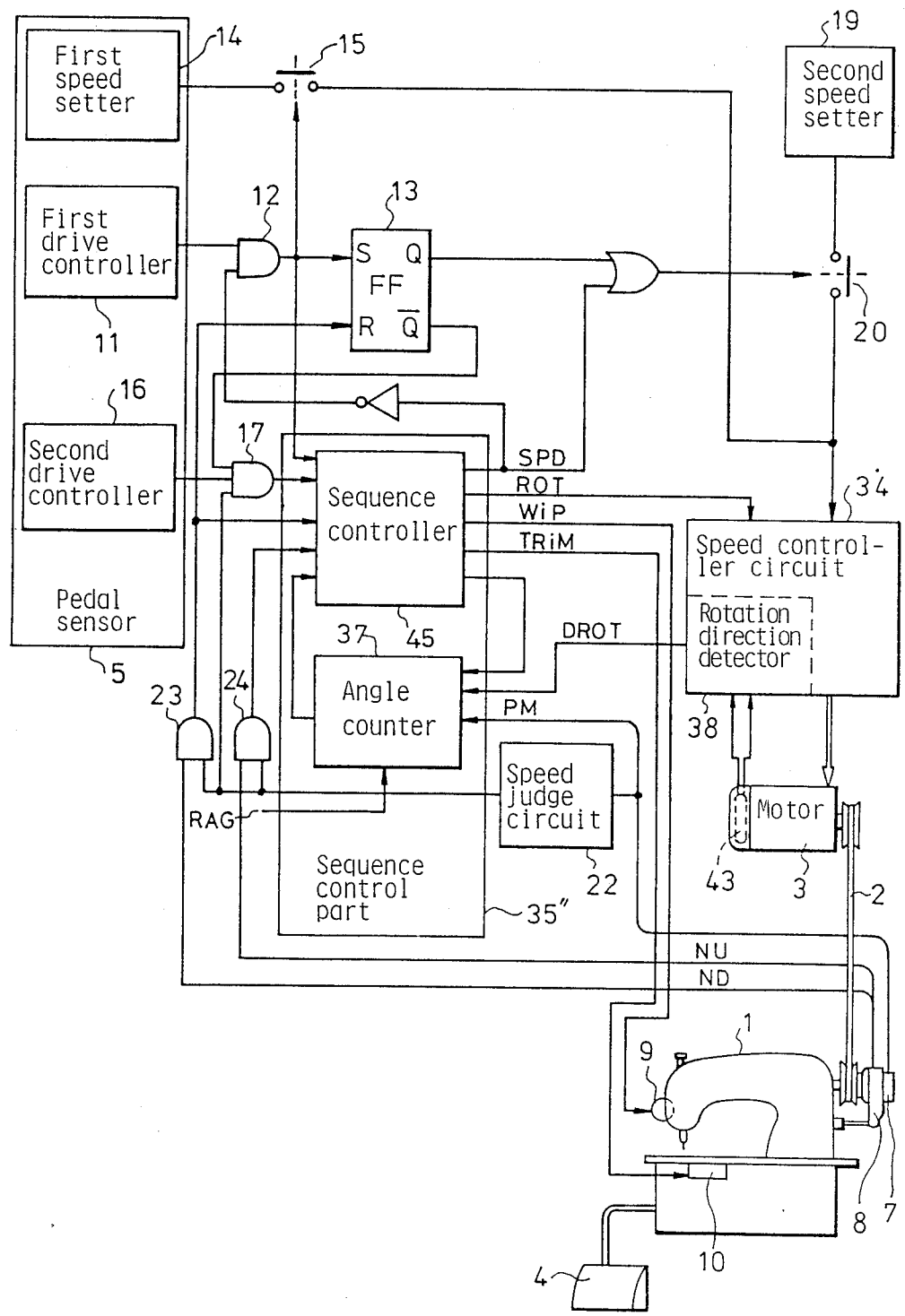
Figure 7:
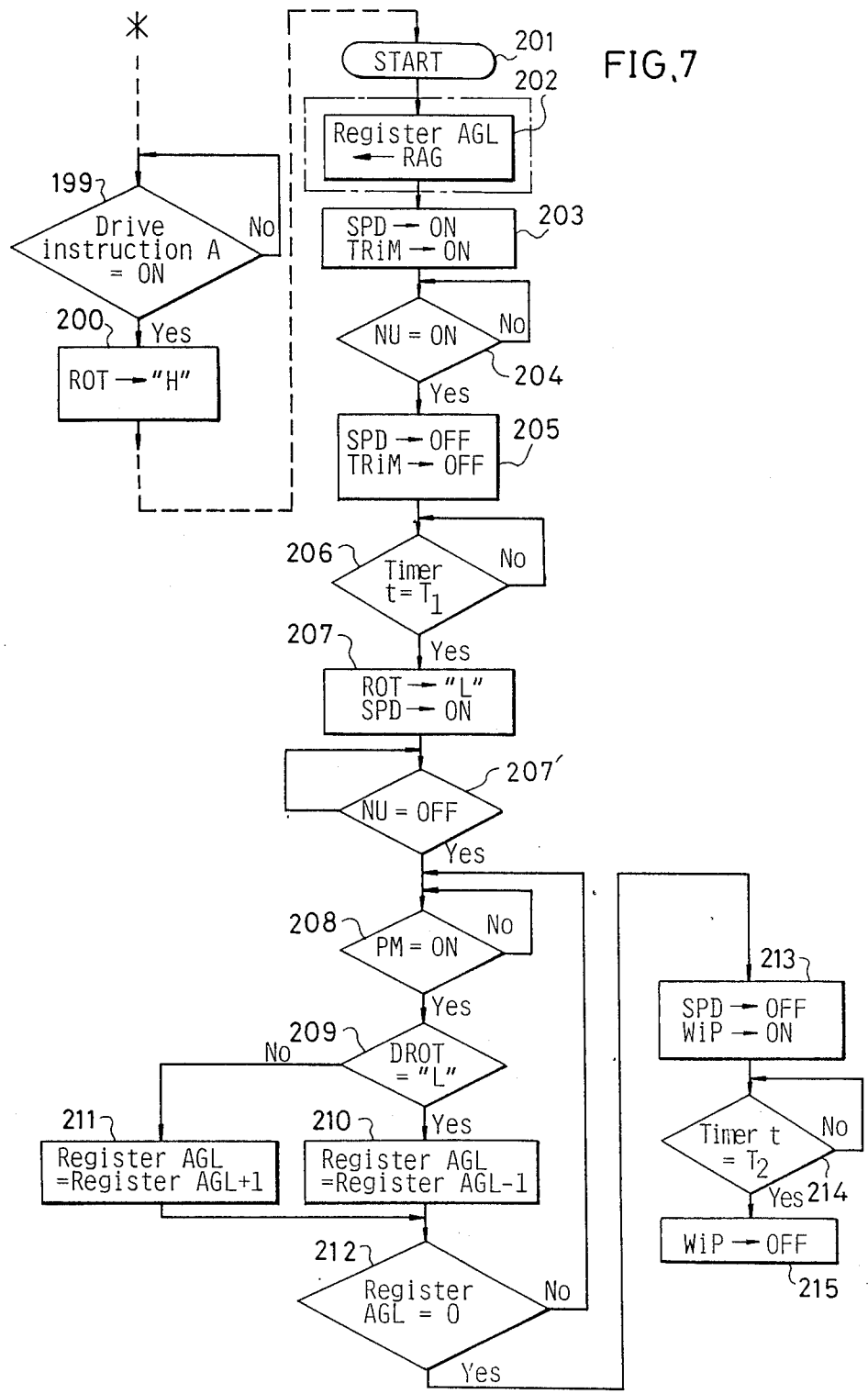

A third preferred embodiment is described with reference to FIG. 6 and FIG. 7, wherein FIG. 6 is a circuit block diagram and FIG. 7 is a sequence flow chart for realizing operation of the sequence control part 35" of the circuit.

In this third embodiment, the similar or the same parts and components are designated by the corresponding numerals and marks, and redundant descriptions thereof are omitted for simplicity. The difference from the first embodiment of FIG. 1 is that the operation flow of FIG. 7 of the sequence control part 35" is different from that of FIG. 2.

That is, in the first embodiment, after lapse of time $T_1$ from deenergization of the thread trimming solenoid 9, the signal "ROT" becomes "L" (step 207 of FIG. 2) and the counting of the signal "PM" from the speed detector 7 is made immediately after turning ON of the signal "SPD" (step 208 of FIG. 2). But, in this third embodiment (FIG. 7), the counting of the signal "PM" (step 207' of FIG. 7) starts from turning OFF (which corresponds to needle up position) of the output "NU" of the needle position detector 8.

According to this third embodiment, by staring the counting of the angle (step 208–212) to the stop position from the needle-up position signal, issued (step 207') after trimming the thread (step 205), is performed by the operation of the sequence control part 35". Therefore, the fluctuation of needle stop positions after completion of a thread trimming, such as at a time between the periods $T_1$ of signal SPD of FIG. 3, does not influence the final stop position of the needle after the reverse rotation of the sewing machine.

Figure 8:
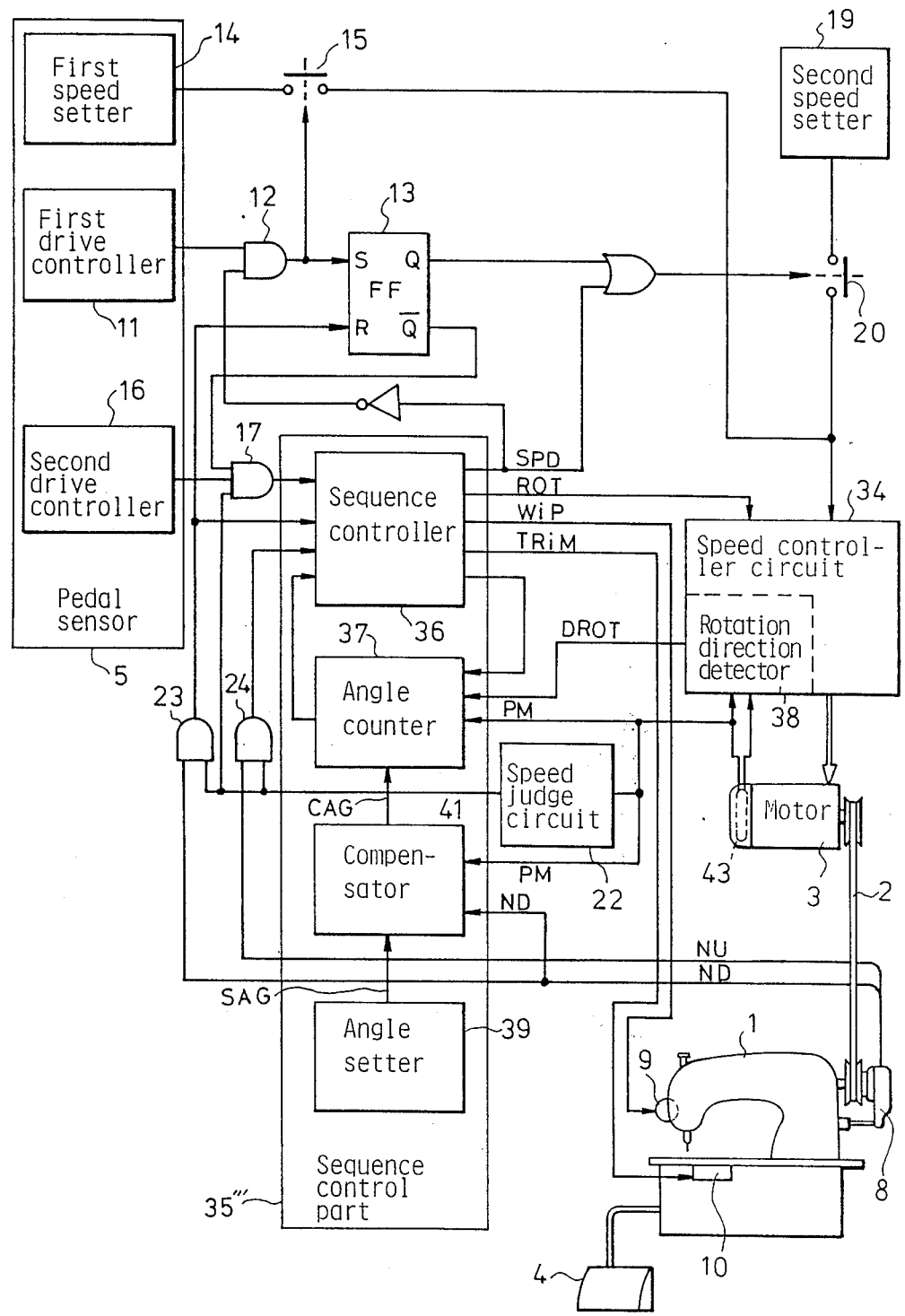
Figure 9:
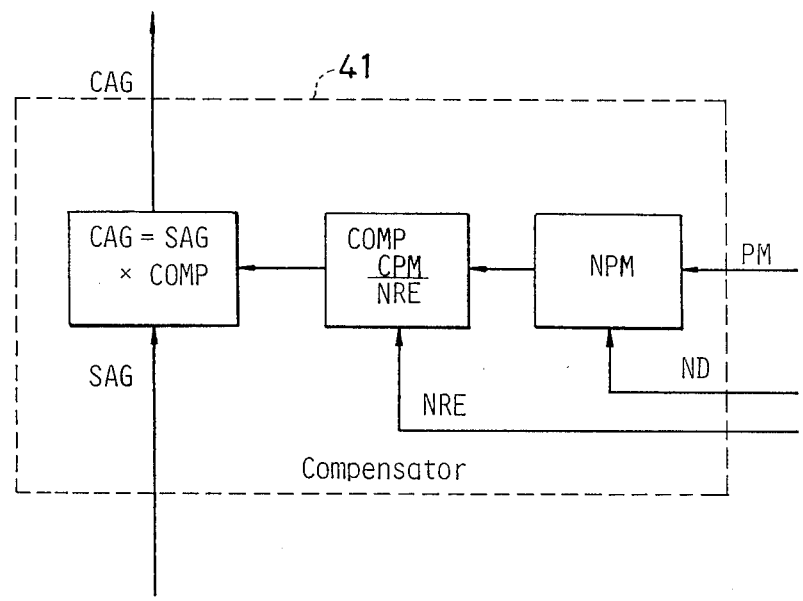

A fourth preferred embodiment is elucidated with reference to FIG. 8 and FIG. 9.

Figure 10:
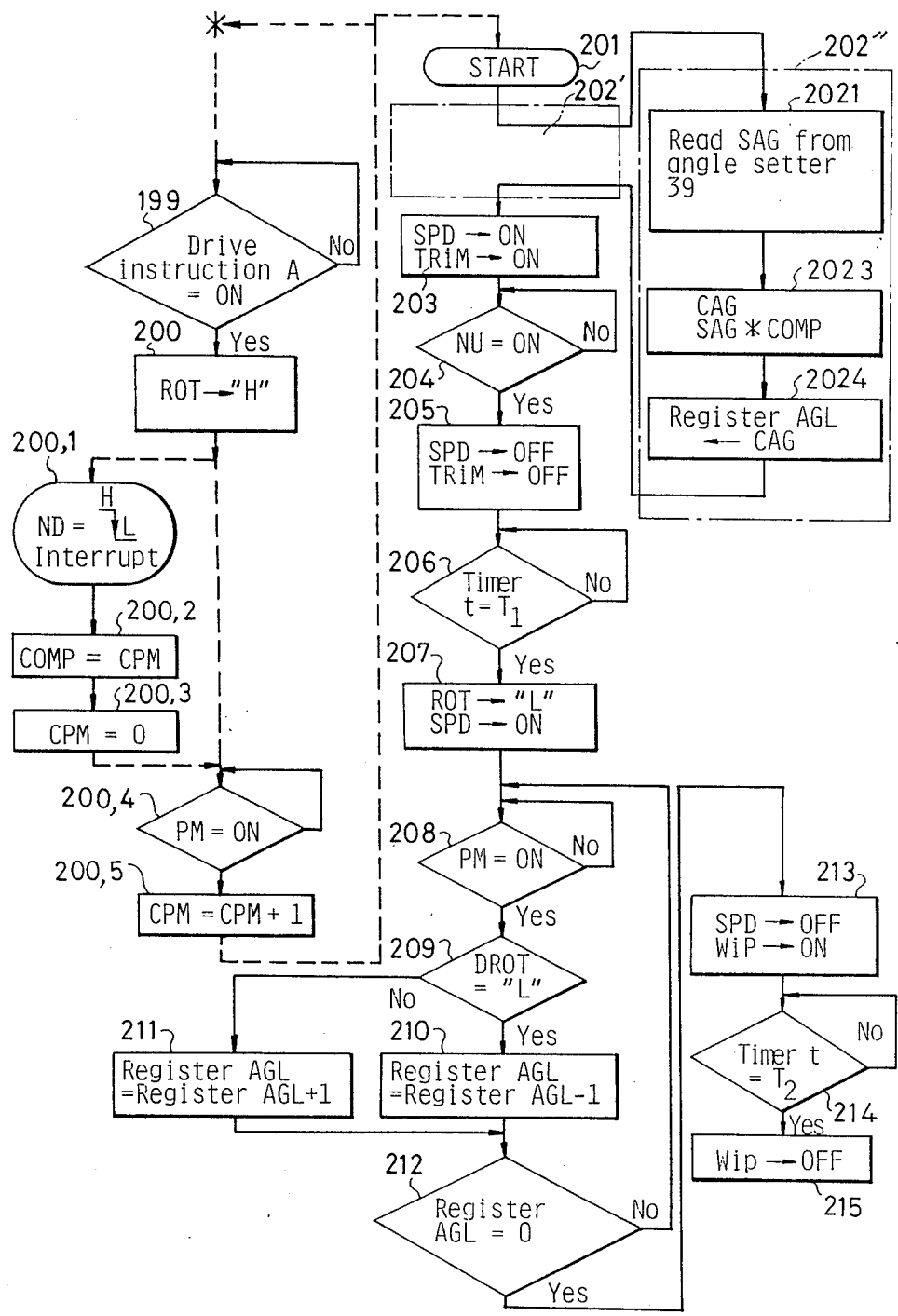
Figure 11:
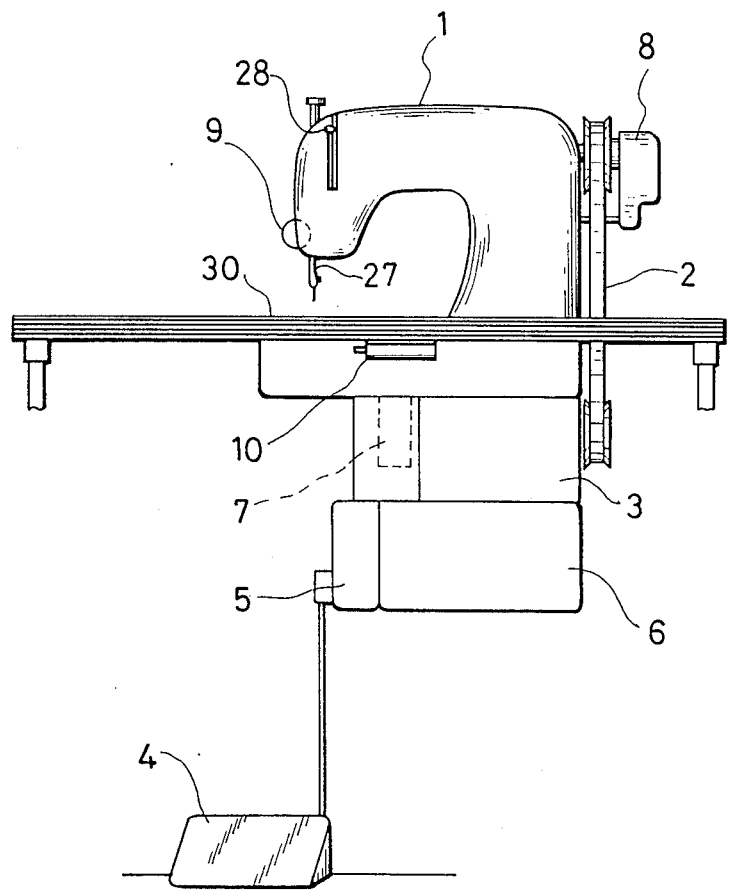
FIG. 11 is a general configuration of a sewing machine.
Figure 12:
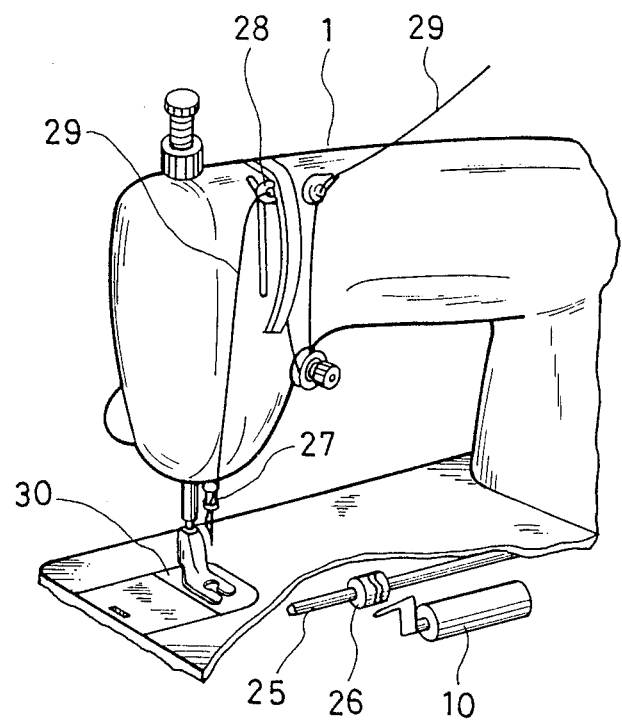
FIG. 12 is an enlarged perspective view of head part of the sewing machine.
Figure 13:
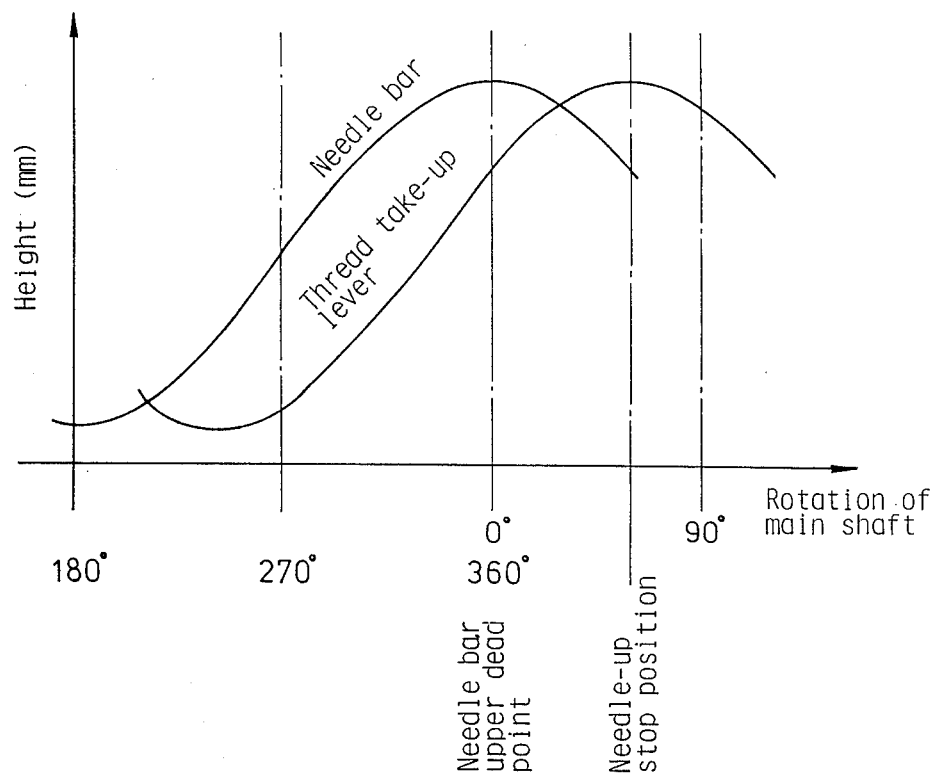
FIG. 13 is a time chart showing motions of needle bar and thread take-up lever of a conventional sewing machine.
Figure 14:
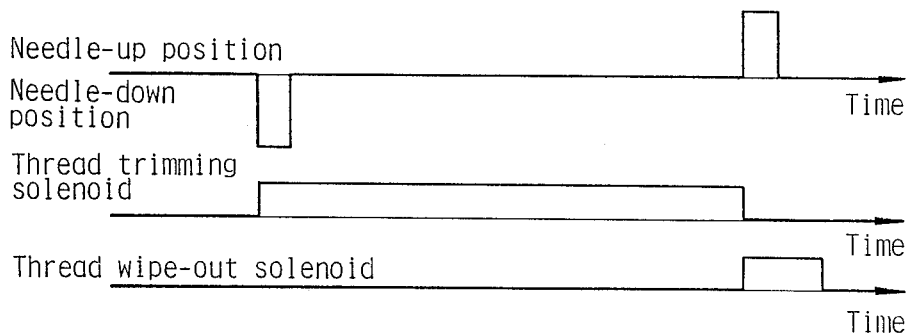
FIG. 14 is a time chart showing thread trimming action of the conventional sewing machine.

FIG. 8 is a circuit block diagram and FIG. 9 is a block diagram showing one example of a detailed configuration of a compensator 41 provided in the sequence control part 35''', and FIG. 10 is a sequence flow chart for realizing the operation of the sequence control part 35'''.

In this fourth embodiment, the similar or the same parts and components are designated by the corresponding numerals and marks, and redundant descriptions thereof are omitted for simplicity.

The difference from the configuration of the first embodiment of FIG. 1 is that, besides the angle setter 39 as in the circuit of FIG. 4, a compensator 41 is provided, and the output of the motor speed detector 43 is also given to the angle counter 37, to the speed judge circuit 22, and to the compensator 41. The compensator 41 further receives a signal rotation angle of the sewing machine from the needle position detector 8. Thereby, the value "SAG", which is set by the angle setter 39, (step 2021 of FIG. 10) is compensated into a value "CAG" (steps 2023–2024 of FIG. 10) to be given to the angle counter 37 (step 208–212).

The operation of the essential part, which is different from the foregoing embodiments, of this fourth embodiment is as follows. First, the compensator 41 receives a signal corresponding to the rotation angle of the sewing machine from the needle position detector 8. In this embodiment, the compensator 41 receives the needle down signal "ND" as a phase detection signal of the one rotation of the sewing machine (step 200.1). Furthermore, by receiving output of the motor speed detector 43, the compensator 41 can have a signal corresponding to the motor rotation angle (step 200.4–200.5). In this embodiment, 360 pulses per one rotation of the motor 3 ("NRE") is given from the motor speed detector 43 to the compensator 41. The compensator 41 counts pulses (step 200.1–200.5) given during one rotation of the sewing machine which correspond to the time period between neighboring two needle down signals. Therefrom, the ratio "COMP" of rotation "CPM" of the sewing machine 1 to the rotation number "NRE" of the electric motor 3 is obtainable. For instance, when there are 200 pulses between the neighboring two needle down signals, if the rotation angle of the sewing machine is 360°, then the rotation angle of the motor is given (step 200.2–2023) as $$200 \ pulses/360 \ pulses = 5/9 \ (rotation).$$

If it is desired that, after a thread trimming, the sewing machine should be rotated in reverse direction for 60°, by setting a number of 60 as the signal "SAG" (step 2021) the compensator 41 gives the initial value "CAG" of $60 \times (5/9) \approx 33$ to the angle detector 37 (step 2024).

In this embodiment, the compensation value of "5/9" is computed (step 199–200.5, 2023) during the driving of the sewing machine at the initial pedal pressing immediately after switching ON of the power switch, and there is no actual initialization problem initialization.

As has been described, in this fourth embodiment, even when the gear reduction ratio of the sewing machine and the driving motor varies, a desirable reverse drive angle for lifting up the needle after thread trimming is satisfactorily obtainable. In general, in industrial sewing machines, the belt driving of the sewing machine is familiar, and changing of pulley diameter is often made by the user to correspond to kinds of works, and the gear reduction ratio is frequently changed. Even with such changes, the fourth embodiment can flexibly respond.

The present invention is of course applicable to any kind of sequence in the sewing machine accurate control of reverse rotation angle is required.

Though in the afore-mentioned embodiments the thread wipe out solenoid is energized after reverse rotation of the motor, the order can be reversed such that the reverse rotation is made after driving of thread wipe out solenoid. This means that the present invention is applicable to a sewing machine wherein the thread trimming cutter is driven during the reverse rotation of the sewing machine.

In the sequence controller 36 of the foregoing embodiments, the driving and stopping of the sewing machine is instructed by the output signal "SPD", and the direction of rotation is instructed by the output signal "ROT"; but, other configuration can be made such that the driving and stopping in forward rotation is instructed by the output "SPD" and the driving and stopping of reverse rotation is instructed by the output "ROT".

What is claimed is:

1. A sewing machine comprising:
   a sewing mechanism including a thread trimmer,
   an electric motor for driving said sewing mechanism,
   a speed detector for detecting rotation speed of said sewing mechanism by issuing a predetermined number of speed signal pulses during one sewing period,
   a needle position detector for detecting the position of a sewing needle,
   a speed controller circuit for controlling rotation speed and stopping position of said sewing mechanism,
   a sequence control part for controlling sequential operation of said sewing machine, including
      a sequence controller for controlling at least said thread trimmer,
      an angle counter for counting the angle of rotation of said sewing mechanism by counting said speed signal pulses, and
   reverse rotation means for making reverse rotation of said motor for a predetermined angle after completion of thread trimming by said thread trimmer.

2. A sewing machine in accordance with claim 1, wherein
   said sequence controller comprises an angle setter for setting the necessary angle to rotate said sewing mechanism in a backward direction.

3. A sewing machine in accordance with claim 1, wherein
   said sequence controller comprises means to issue an instruction signal to said speed controller circuit for reverse rotation of said sewing mechanism for said predetermined angle making reference to a needle position signal.

4. A sewing machine comprising
   a sewing mechanism including a thread trimmer,
   an electric motor for driving said sewing mechanism,
   a pedal sensor for sensing motion of the pedal to issue a drive instruction signal,
   a speed detector for detecting rotation speed of said sewing mechanism by issuing a predetermined number of speed signal pulses during one sewing period,
   a needle position detector for detecting the position of a sewing needle,
   a speed controller circuit for controlling rotation speed and stopping position of said sewing mechanism based on motion and position of said pedal,
   a sequence control part for controlling sequential operation of said sewing machine based on signals from said pedal sensor, said speed detector and said needle position detector, said sequence control part including
   a sequence controller for controlling at least said thread trimmer,
   an angle counter for counting the angle of rotation of said sewing mechanism by counting said speed signal pulses, and
   reverse rotation means for making reverse rotation of said motor for a predetermined angle after completion of thread trimming by said thread trimmer until substantially the upper dead point of said needle is reached.

* * * * *